US008527988B1

(12) United States Patent
Rhine

(10) Patent No.: US 8,527,988 B1
(45) Date of Patent: Sep. 3, 2013

(54) PROXIMITY MAPPING OF VIRTUAL-MACHINE THREADS TO PROCESSORS

(75) Inventor: Scott Rhine, Isanti, MN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1069 days.

(21) Appl. No.: 12/533,244

(22) Filed: Jul. 31, 2009

(51) Int. Cl.
*G06F 9/455* (2006.01)
*G06F 9/46* (2006.01)

(52) U.S. Cl.
USPC .............................. 718/1; 718/104

(58) Field of Classification Search
USPC ........................................ 718/104
See application file for complete search history.

(56) References Cited

U.S. PATENT DOCUMENTS

| | | | |
|---|---|---|---|
| 5,745,778 A * | 4/1998 | Alfieri | 712/1 |
| 6,026,425 A | 2/2000 | Suguri et al. | |
| 6,081,665 A | 6/2000 | Nilsen et al. | |
| 6,269,391 B1 | 7/2001 | Gillespie | |
| 6,301,603 B1 | 10/2001 | Maher | |
| 6,651,082 B1 | 11/2003 | Kawase et al. | |
| 6,658,448 B1 | 12/2003 | Stefaniak et al. | |
| 6,687,735 B1 | 2/2004 | Logston et al. | |
| 6,735,613 B1 | 5/2004 | Jean-Dominique | |
| 6,769,017 B1 | 7/2004 | Bhat | |
| 6,854,115 B1 | 2/2005 | Traversat et al. | |
| 6,993,762 B1 | 1/2006 | Pierre | |
| 7,062,768 B2 | 6/2006 | Kubo et al. | |
| 7,093,258 B1 | 8/2006 | Miller et al. | |
| 7,287,254 B2 | 10/2007 | Miller et al. | |
| 2002/0165900 A1 | 11/2002 | Kubo et al. | |
| 2003/0088608 A1 | 5/2003 | McDonald | |
| 2004/0019891 A1 * | 1/2004 | Koenen | 718/102 |
| 2006/0259818 A1 * | 11/2006 | Howell et al. | 714/21 |
| 2009/0157935 A1 * | 6/2009 | Worthington et al. | 710/264 |
| 2009/0182915 A1 * | 7/2009 | Farrell et al. | 710/104 |
| 2010/0223622 A1 * | 9/2010 | Anand et al. | 718/105 |
| 2010/0333087 A1 * | 12/2010 | Vaidyanathan et al. | 718/1 |

* cited by examiner

*Primary Examiner* — Abdullah Al Kawsar
*Assistant Examiner* — Blake Kumabe

(57) ABSTRACT

Virtual machine threads are mapped to virtual processors. Groups of virtual processors are formed. The number of virtual processors in each group is selected to match a number of unassigned physical processors in a proximity. The virtual processors of each group are selected so that the total estimated interactivity for the group is significantly above average for groups having the same number of those virtual processors.

17 Claims, 5 Drawing Sheets

PROXIMITY MAPPING OF VIRTUAL-MACHINE THREADS TO PROCESSORS

BACKGROUND

Herein, related art is described for expository purposes. Related art labeled "prior art", if any, is admitted prior art; related art not labeled "prior art" is not admitted prior art.

Running applications in virtual machines executing on a multi-processor system can be cost-effective as computing resources can be dynamically allocated to workloads according to demand. Each virtual machine can have one or more process threads that are assigned to processors for execution. Since threads from the same virtual machine are likely to be working on a common task, they are more likely to interact than are threads from different virtual machines. Therefore, the different threads from a given virtual machine can be assigned to different processors so that they can execute concurrently and do not have to wait for each other to be activated to exchange data. Where there are more total threads than processors, threads can time-share a processor.

DETAILED DESCRIPTION

In systems where inter-processor communications speeds vary among processor pairs, some assignments of threads to processors offer better performance than others. For example, to avoid contention issues involving communications over a common system bus, processors can be arranged in "proximities"; within each proximity, processors communicate over a local bus. Communications between processors within a proximity are faster than communications between processors of different proximities. Generally speaking, assigning the threads of a virtual machine to different processors of the same proximity allows them to execute concurrently and communicate expeditiously. However, competing considerations, e.g., the desirability of distributing work evenly among processors, may make it difficult to ensure all threads of each virtual machine are assigned to different processors of the same proximity.

Herein, the complexity associated with assigning threads to processors is reduced by breaking the task into two more-readily optimized steps: 1) assigning threads to virtual processors; and 2) assigning virtual processors to physical processors. The latter task is further simplified by forming groups of virtual processors; the groups are sized to match the available capacities of proximities. The virtual processors of a group are selected with an aim toward maximizing the estimated amount of inter-processor communication so as to leverage the faster communications available within the proximity to which the group is to be assigned.

Figure 1:
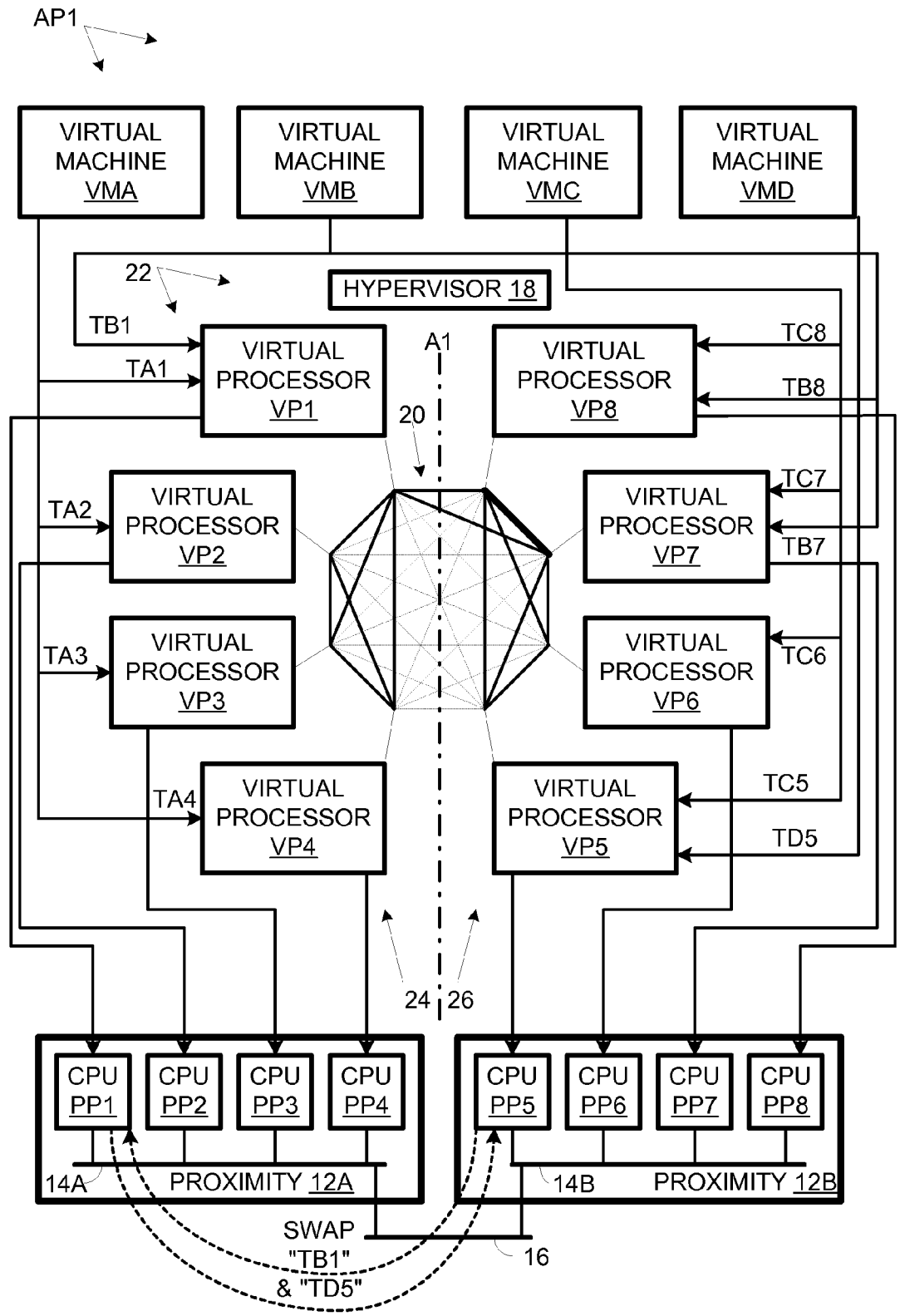
FIG. 1 is a schematic diagram of a multi-processor system running virtual machines.

A system AP1, a portion of which is shown in FIG. 1, includes sixty-four processors (not all are shown) arranged in sixteen four-processor proximities, including proximities 12A and 12B. Proximity 12A includes four processors PP1-PP4 and a local intra-proximity bus 14A, over which processors PP1-PP4 communicate with each other. Proximity 12B includes four processors PP5-PP8 and a local intra-proximity bus 14B over which processors PP5-PP8 communicate with each other. An inter-proximity bus 16 provides for communications between proximities 12A, 12B, and other proximities. Other embodiments provide for different numbers of proximities, differing numbers of processors per proximity, and various provisions for inter-proximity communications. The proximities of a system need not all have same number of active processors, especially since processors can fail or be powered down to save energy costs, etc.

A hypervisor 18 and a number of virtual machines including virtual machines VMA, VMB, VMC, and VMD are running on system AP1. Alternative embodiments can include different types (Type I, Type II, etc.) of hypervisors and other numbers and underlying technologies of virtual machines. The virtual machines of system AP1 can be assigned different virtual-machine weights, e.g., corresponding to different priorities or entitlements. For example, virtual machines may be guaranteed different entitlements (minimum levels of resources) or conflicts over resources may be resolved in favor of one virtual machine over another. For virtual machines VMA-VMD, the weights are all 0.5 CPU. However different weights can be assigned to the virtual machines.

Hypervisor 18 provides for mapping virtual-machine threads to virtual processors, the number of which matches the number of available physical processors. In the time period represented by FIG. 1, virtual machines VMA-VMD have threads TA1-TA4, TB1, TB7, TB8, TC5-TC8, and TD5. Hypervisor 18 includes a virtual-machine scheduler that maps these threads to virtual processors VP1-VP8 as shown in FIG. 1. The virtual processors can be time shared so that more than one thread can be mapped to a virtual processor; however, threads from the same virtual machine are assigned to different virtual processors so that they can execute concurrently, and, thus, interact more expeditiously.

An octagonal graph 14 (shown in the middle of the virtual processors in FIG. 1) represents virtual processors VP1-VP8 as vertices; the "edges" connecting the vertices collectively represent all communications paths between pairs of virtual processors. In general, for n processors, there are $n*(n-1)/2$ such edges. For eight virtual processors, there are twenty-eight pair-wise edges. Graph 14 is one of several subgraph communities for system AP1; other subgraph communities are associated with virtual machines and virtual processors not represented explicitly in FIG. 1.

Figure 2:
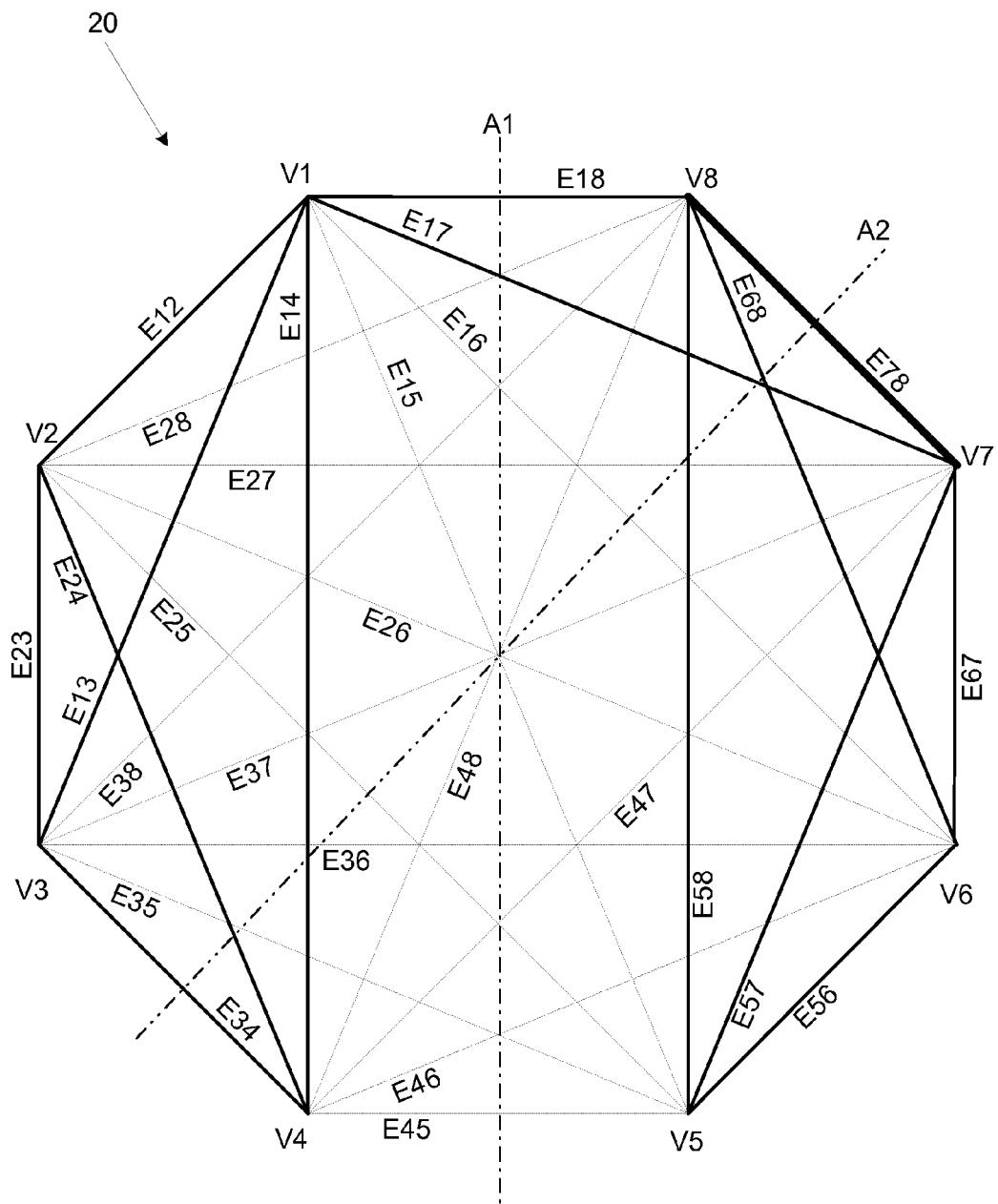
FIG. 2 is a graph representing thread interactions between virtual processors of the system of FIG. 1.

Graph 20 is shown enlarged in FIG. 2. Vertices V1-V8 correspond to virtual processors VP1-VP8 of FIG. 1. Edges E12-E18, E23-E28, E34-E38, E45-E48, E56-E58, E67-E68, and E78 correspond to the expected interaction weights associated with respective pairs of processors. For example, edge E78 represents the magnitude of the expected interaction between virtual processors VP7 and VP8. Edge E78 is thicker than the rest, indicating a greater interactivity weight is assigned to the virtual processor pair (VP7, VP8) than to the other pairs. The greater weight is due primarily, but not exclusively, to the fact that virtual processors VP7 and VP8 share two virtual machines (VMB and VMC), whereas other pairs share one or none. Quantitatively, edge E78 has an expected interaction weight of 1.0, the medium thickness edges have a weight of 0.5, and the thin dotted lines have a weight of 0.0.

Medium thickness edges E12, E13, E14, E17, E23, E24, E34, E45, E56, E57, E58, E67, and E68 connect virtual processor pairs that share one virtual machine. For example, edge E12 connects virtual processor VP1 (to which threads from virtual machines VMA and VMB are assigned) and virtual processor VP2 (to which virtual machine VMA is assigned), which share virtual machine VMA. The other depicted edges E15, E16, E25-E28, E35-E38, and E45-E48 connect virtual processors that do not share a virtual machine; such edges are shown as thin dotted lines. For example, edge E15 connects virtual processor VP1 and virtual processor VP5 (to which virtual machines VMC and VMD are assigned), which have no common virtual machines.

The illustrated edge thicknesses convey that different edge weights can be assigned to the expected interactivities associated with different pairs of processors. However the precise edge weight assigned to a pair of virtual processors depends on the weight or weights assigned to the virtual machine or virtual machines whose threads are involved in the interactions. In this case, the edge weight associated with an edge is the sum of the weights of the virtual machines involved in the interactions. Thus, the weight (1.0) of edge E78 is the sum of the weights (0.5+0.5) associated with virtual machines VMC and VMD; the heavy thickness of edge E78 corresponds to a high expected interactivity between virtual processors VP7 and VP8. The edge weight can be zero (no interactivity) if no virtual machines are shared, or equal to the weight of a single virtual machine if only one virtual machine is shared. Other embodiments provide other methods for computing edge weights from virtual-machine weights. It is expected that the relative degree of communication between virtual processors connected by an edge is proportional to the edge weight.

Once threads are assigned to virtual processors, hypervisor 18 divides the sixty-four virtual processors into communities such that: 1) edges between communities have zero or at most negligible weight; and 2) each virtual processor within a community is connected to every other virtual processor in that community via a series of one or more non-zero-weight edges. Virtual processors VP1-VP8 constitute one such community 22. Note, for example, while virtual processors VP4 and VP5 are directly connected by a zero weight edge E45, they are also connected to each other by a series of edges including E14, E18, and E58.

Ideally, all processors in a community would be assigned to a single proximity. However, community 22 cannot be assigned to either of proximities 12A and 12B, because they include only four processors each, while community 22 has eight virtual processors. Therefore, one or more groups of processors from community 22 must be formed that can fit into one or more proximities. In the illustrated example, the eight virtual processors of community 22 end up being divided into two groups 24 and 26 of four; these two groups 24 and 26 are then respectively assigned to proximities 12A and 12B.

Bisecting axis A1 (FIGS. 1 and 2) represents the division of community into group 24 with virtual processors VP1-VP4 and group 26 with virtual processors VP5-VP8. This grouping leaves only two medium weight edges E17 and E18 between groups, for a total weight of 1.0; this is near the minimum possible (0.5) between groups from the same community). In contrast, bisecting axis A2 (FIG. 2) intersects a heavy weight edge E78 and six medium weight edges E34, E24, E14, E58, E17, and E68, for a total weight of 4.0. Thus, axis A1 represents a much better division than does axis A2. It should be noted that there are hundreds of ways of dividing community 22 into groups and that most of these ways are not readily represented by a bisecting axis, at least not without rearranging the depiction of the virtual processors.

Formation of a group from a community (or the full set of virtual processors) takes into account the following considerations: 1) the group size is to match the available capacity of a target proximity (typically, the proximity with the greatest available capacity); 2) the virtual processors of the group are selected to favor high intra-group activity to leverage fast inter-proximity communication speeds. However, the problem of optimally grouping virtual processors to this end can be computationally intense, if not infeasible. However, a significant performance advantage can be achieved with reasonable computation effort as long as groups with significantly higher than random-average estimated interactivity are formed.

While assigning such groups to proximities can achieve a performance advantage, further optimization may be available. For example, it may be possible to move a thread from a source processor in a proximity in which it is "alienated", i.e., all the threads with which it interacts are assigned to other proximities, to a target processor in one of those other proximities. Such a transfer can take place, for example, if there is a "loner" thread (i.e., the sole thread of a virtual machine that will not interact with other threads) assigned to the target processor of substantially equal virtual-machine weight as that of the alienated thread. In such a case, the threads can be swapped without significantly altering the work distribution among processors.

For example, thread TB1 (of virtual machine VMB) can be "moved" from source proximity 12A (which contains no other threads from virtual machine VMB) to target proximity 12B, where it joins other threads from virtual machine VMB. This move can be made without significantly adversely affecting the distribution of work to processors by swapping thread TB1 for thread loner TD5. In other words, thread TD5 can be "moved" from processor PP5 to processor PP1 with no adverse effect since it does not interact. In some cases, a loner thread cannot be swapped, either because swapping would adversely affect the distribution of work or because configuration differences between the source and target proximities would adversely affect the loner thread. For example, the loner thread could require non-interleaved memory, which the source proximity provides but the target proximity does not.

Figure 3:
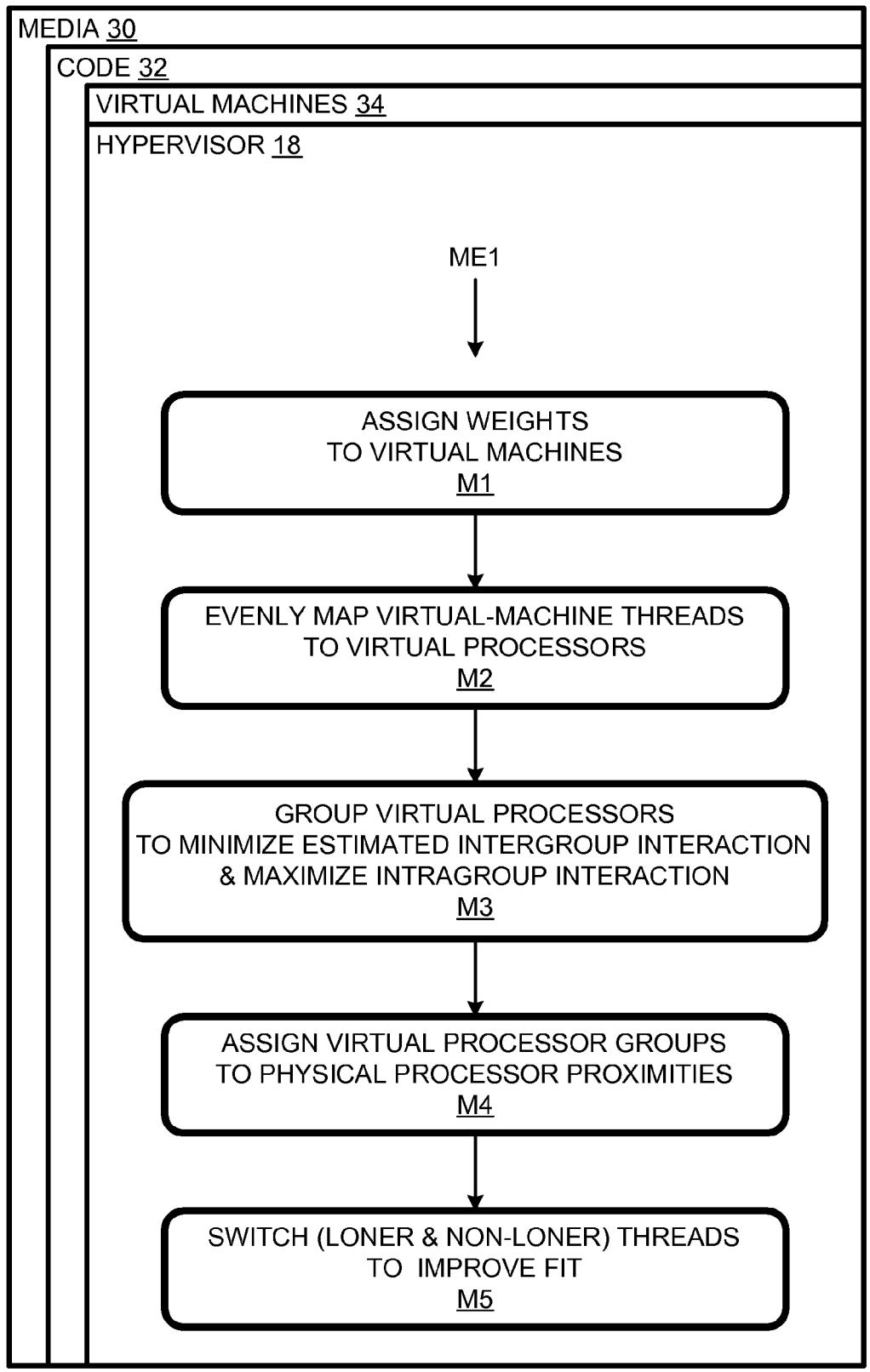
FIG. 3 is a flow chart of a method of assigning virtual machine threads to processors of the system of FIG. 1.

FIG. 3 schematically depicts computer-readable storage media 30, which is encoded with code 32, which defines hypervisor 18 and virtual machines VMA-VMD. Code 32, when executed, provides for a method ME1. Method segment M1 of method ME1 provides for assigning weights to virtual machines, e.g., according to business policies or the nature (e.g., real-time v. non-real-time) of the respective tasks for the virtual machines. Method segment M2 provides for mapping virtual-machine threads to virtual processors so that the expected work associated with the threads is practically evenly distributed, with the expected work associated with a thread corresponding to the virtual-machine weight associated with its source virtual machine.

Method segment M3 involves forming groups of virtual processors selected to favor high total estimated interactivity (edge weight) associated with the group. This can involve dividing virtual processors into communities so that inter-community interaction is at most negligible and so that each virtual processor in a community is connected to every other virtual processor in the community through a series of one or more non-zero-weight edges. Edge weights can be calculated or otherwise determined from virtual machine weights, e.g., by summing the weights associated with the virtual machines shared by the virtual-processors associated with the edge. Likewise, virtual processor weights can be determined from the edge weights, e.g., by summing the weights of all edges connected to a virtual processor.

At least one group of virtual processors that can fit within the available capacity of a proximity is formed from a community that is too large to fit within the available capacity of any proximity. For example, at least one group (in this case two groups) of virtual processors is formed from community 22 because its eight virtual processors exceeds the available capacity (four each) of proximities 12A and 12B. Groups are formed with an aim of maximizing or at least favoring a high group weight, a high total edge weight associated with the group.

Once the groups are formed, they can be assigned to proximities at method segment M4. In system AP1, the assignment of virtual processors in a group to processors in the assigned proximity can be arbitrary. However, further optimization may be achievable at method segment M5 by swapping threads between physical processors that are in different proximities, as explained above with respect to alienated thread TB1 and loner thread TD5 of FIG. 1.

As the number of active threads associated with a virtual machine can vary over time, method ME1 can be iterated so that the assignment of threads to physical processors varies dynamically. For example, method ME1 can be iterated every ten seconds. Finding an absolute optimum division of virtual-processor communities for each iteration can be infeasible, but a practically favorable division can be found using a more recursive "greedy" procedure with a relatively modest computational load.

Figure 4:
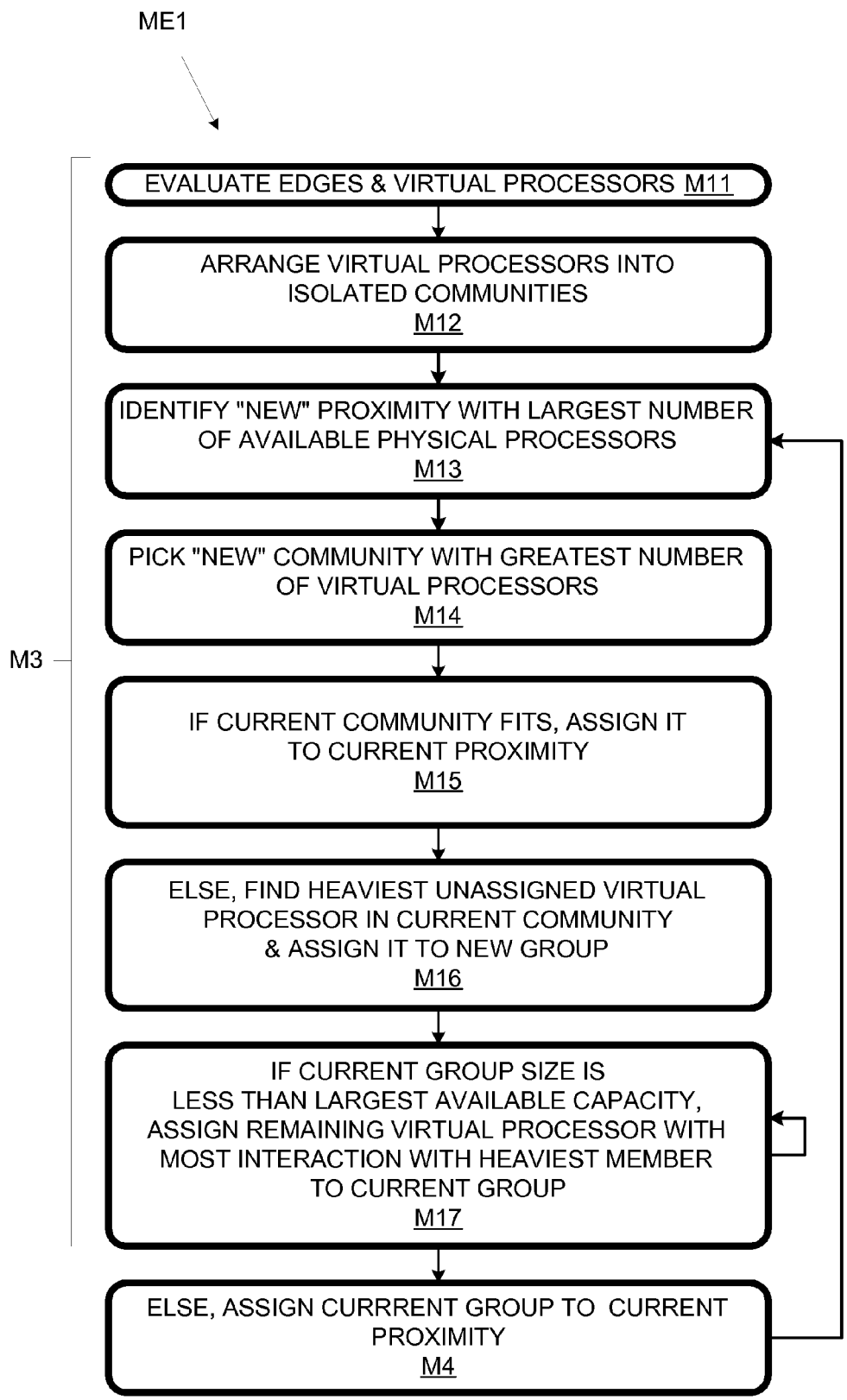
FIG. 4 is a flow chart of a recursive implementation of a portion of the method of FIG. 3.

Thus, as shown in FIG. 4, method segment M3 can involve evaluating edges and virtual processors at method segment M11. This can involve assigning an edge weight equal to the weights of the virtual machines shared by the virtual processors associated with the edge. The weight of a virtual processor, in this case, is the weight of the edges connecting it to processors. For example, the virtual-processor weight of virtual processor VP1, FIG. 1, is the sum of the weights of edges E12-E18, and the virtual-processor weight of virtual processor VP8 is the sum of the weights of edges E18-E78.

In the illustrated embodiment, the virtual processors are then arranged into "isolated" communities. Thus, the sixty-four virtual processors of system AP1, can be divided into several communities, one of which, community 44, is shown in FIG. 1. A community is "isolated" when none of its processors are connected by an edge having more than a zero or other negligible weight. Within each of the communities formed at method segment M12, each virtual processor in the community is connected to at least one other virtual processor in the community by an edge with significant weight.

Method segment M13 involves identifying a "new" proximity that is the proximity with the largest available "capacity", i.e., the greatest number of physical processors that have not been already been assigned to virtual processors (in the current iteration of method ME1). Where, as will commonly be the case initially, many proximities have the same number of available processors, the selection of the "new" proximity can be arbitrary. However, the selection becomes less arbitrary as virtual processors are assigned to proximities and available capacities are reduced. This greatest available number of processors in any proximity determines 1) whether or not a selected community can fit into a proximity, and 2) if not, the size (number of virtual processors in) of a group to be "carved out of" the community and assigned to that proximity.

At method segment M14, the largest community is selected. In case of ties, the community with the greatest total edge weight can be selected. Other embodiments employ other criteria to sequence community selections. If this "new" community fits the current proximity (i.e., the new proximity of method segment M13), it is assigned to that proximity at method segment M15. In other words, each virtual processor of the current community is assigned to a physical processor of the current proximity.

If the current community does not fit in the current proximity, a new group of virtual processors from the current community will be formed that matches the available capacity of the current proximity. The group can be formed one virtual processor at a time. The first virtual processor to be assigned, at method segment M16, to the current group is the "heaviest" virtual processor, i.e., the virtual processor with the greatest weight in the current community.

If the current size of the group being formed is less than the (largest available) capacity of the current proximity, the remaining virtual processor (i.e., in the current community but not yet assigned to the current group) with the most interaction with the heaviest member of the group is assigned to the group at method segment M17. Method segment M17 is repeated until the current group size matches the available capacity of the current proximity. In a variation, the virtual processor with the most total interaction with previously assigned members of the group is added to the group.

Once the group size matches the available capacity of the current proximity, the current group is assigned to the current proximity at method segment M4, with the assignment of virtual processors to physical processors being arbitrary. In an alternative embodiment, slight differences in intra-proximity communications speeds are taken into account in assigning virtual processors to physical processors.

Method ME1 returns to method segment M13 for the next recursive iteration. A new proximity is likely to be picked because the capacity of the previous proximity will have been filled or at least reduced in the previous iteration. The community selected at method segment M12 will likely not be the previous community, as any members of a community that have already been assigned to physical processors are not considered as part of the community for purposes of the recursive steps.

Figure 5:
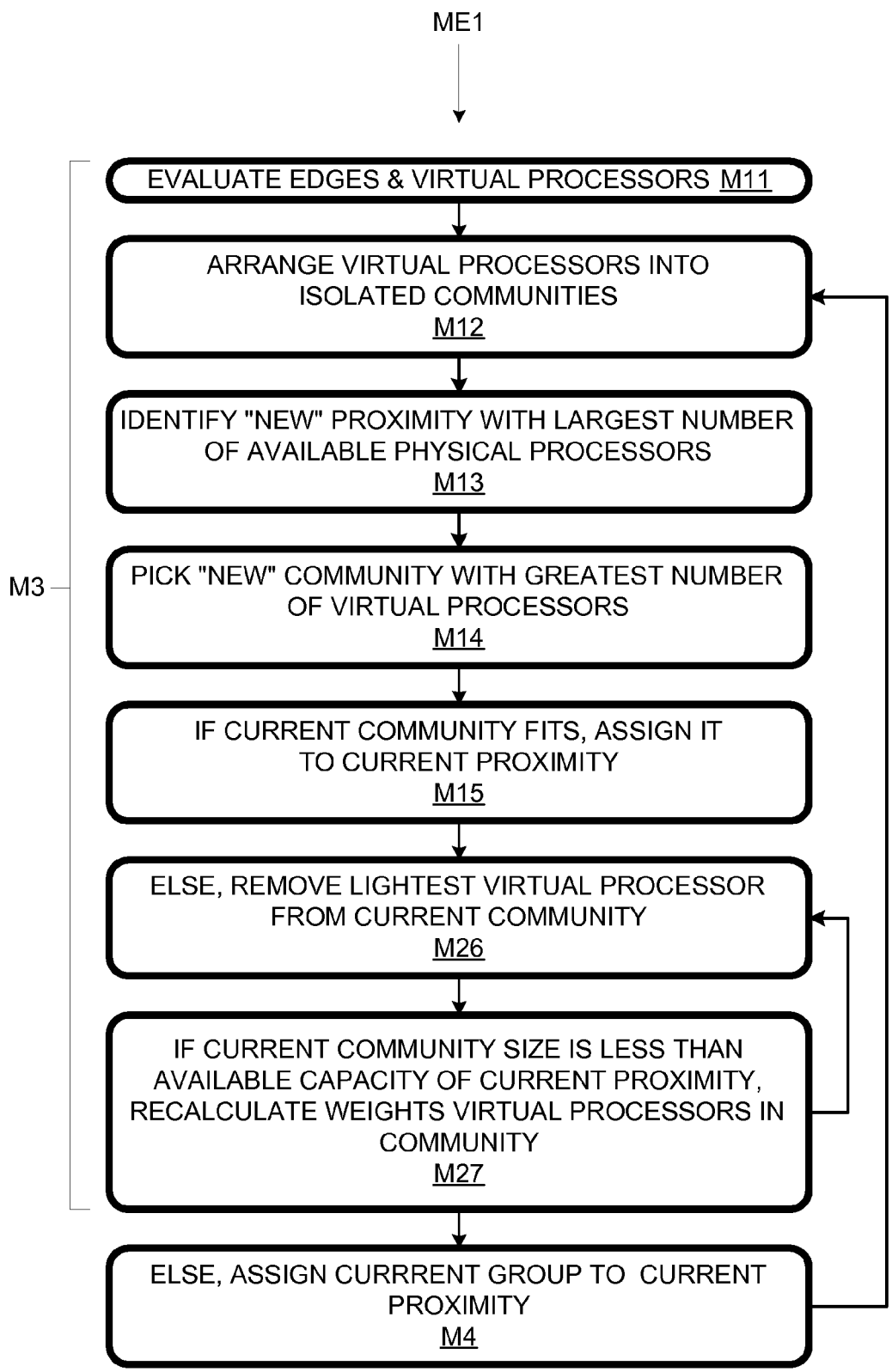
FIG. 5 is a flow chart of another recursive implementation of a portion of the method of FIG. 3.

In another variation of method ME1, method segment M3 is implemented differently, as flow-charted in FIG. 5. Method segments M11-M15 are basically unchanged, but method segments M16 and M17 of FIG. 4 are replaced by method segments M26 and M27 of FIG. 5. At method M26m if the current community does not fit into the current proximity, the lightest virtual processor is removed from the current community. If the resulting current community (group) size is less than the available capacity of the current proximity, the virtual processor weights are recalculated at M27. In the recalculation, the edge weights associated with virtual processors that have been removed from the community are not taken into account. Method ME1 then returns to method segment M26 to remove the virtual processor with the lightest weight as just recalculated.

Once the community size has been pared down to the available capacity of the current proximity, the current community is assigned to the current proximity at method segment M4. In the variation of FIG. 5, method ME1 returns to method segment M12, which involves arranging the virtual processors into isolated communities. This is done to accommodate virtual processors that have been removed from communities in previous iterations of method segment M26. In the illustrated variation, all virtual processors removed from a community are arranged into a single community, even though this may mean one or more virtual processors may not have significant interactions with any other virtual processors in the community. In another subvariation, the virtual processors removed from a community are arranged into as many communities as are necessary to ensure that each processor in a community has significant expected interaction with at least one other virtual processor in its community.

For an example regarding system AP1, virtual processors VP1, VP7, and VP8 have initial weights of 2.5 each. All other virtual processors VP2-VP6 have initial weights of 1.5 each. The first proximity can be proximity 12B and the first virtual processor removed can be virtual processor VP2. The weights of remaining virtual processors VP1 and VP3-VP8 are then recomputed. Virtual processors VP1, VP3, and VP4 each get 0.5 lighter as a result of the removal of virtual processor VP2. Thus, the recalculated weight of virtual processor VP1 is 2.0, and the recalculated weights of virtual processors VP3 and VP4 are both 1.0. Thus, virtual processors VP3 and VP4 will be removed in the next two iterations of method segment M26. By the end of the third iteration of method segment M27, virtual processor VP1 has a weight of 0.0, so it is removed in the fourth iteration. Now the current community fits and is assigned to proximity 12B at method segment M4. Upon the return to method segment M12, FIG. 5, removed virtual processors VP1-VP4 are formed into a community, which can be assigned to proximity 12A, as indicated in FIG. 1.

Other constraints and factors can affect the assignment of threads to physical processors. For example, system AP1 can be a 64-processor system, with the processors arranged in eight eight-processor cells. Each cell can include memory media that can be accessed more rapidly by local processors (of the same cell) than by remote (from other cells) processors.

In general, spinlock cache access from the same bus can be 2-3 times faster than remote cache access. Well-written programs spend less than 2 percent of their time pended on locks, the net benefit can be on the order of 5 percent, which is a significant measurable gain from a software change. The described and other variations upon and modifications to the illustrated embodiment are within the scope of the following claims.

What is claimed is:

1. A method of assigning virtual-machine threads to physical processors arranged in plural proximities such that inter-processor communications between processors in different proximities are over a common bus, while inter-processor communications between processors within the same proximity are over a bus local to that proximity, said method comprising:
    mapping virtual-machine threads to virtual processors such that each virtual-machine thread is mapped to one virtual processor at any given time;
    forming, in response to the mapping of virtual-machine threads, virtual-processor groups of said virtual processors, said virtual-processor groups being formed such that each virtual-processor group has a number of virtual processors that matches a number of unassigned physical processors of a respective proximity, said virtual-processor groups being formed by selecting virtual processors that provide a total estimated virtual-machine thread interactivity for the virtual-processor group that is greater than average virtual-machine thread interactivity for virtual-processor groups having the same number of said virtual processors, total estimated virtual-machine thread interactivity being based on the virtual-machine threads mapped to virtual processors of a virtual-processor group; and
    assigning each of said virtual-processor groups to respective ones of said proximities so that virtual processors of a virtual-processor group are mapped to physical processors of the respective proximity so that the virtual-machine threads assigned to virtual processors of a virtual-processor group execute on respective physical processors of the proximity to which the virtual-processor group is assigned.

2. A method as recited in claim 1 further comprising assigning respective virtual machine weights to virtual machines, said estimated virtual-machine thread interactivity being at least in part a function of said virtual-machine weights.

3. A method as recited in claim 1 wherein said grouping involves:
    assigning said virtual processors to communities so that there is at most negligible estimated interaction between communities; and
    for a first community with too many virtual processors to be mapped to physical processors of a first proximity, forming a first virtual-processor group of virtual processors from said community such that the number of virtual processors in said virtual-processor group is equal to the number of physical processors available in said first proximity, said assigning involving assigning said first virtual-processor group to said first proximity.

4. A method as recited in claim 3 wherein said grouping further involves assigning edge weights to respective pairs of virtual processors in said first community, assigning respective virtual-processor weights to virtual processors of said community at least in part as a function of the edge weights associated with respective virtual processors, and including the virtual processor of said first community with the greatest virtual-processor weight in said first virtual-processor group.

5. A method as recited in claim 3 wherein said grouping further involves assigning edge weights to respective pairs of virtual processors in said first community, assigning respective virtual-processor weights to virtual processors of said community at least in part as a function of the edge weights associated with respective virtual processors, and removing the virtual processor of said first community with the lowest virtual-processor weight from said community.

6. A method as recited in claim 1 further comprising, after said assigning:
    moving a virtual-machine thread from a first physical processor of a source proximity in which it has at most negligible expected interaction with virtual-machine threads executing on other physical processors in said source proximity to a second physical processor of a target proximity in which it has significant expected interaction with a virtual-machine thread assigned to third physical processor of said target proximity; and
    moving a virtual-machine thread that is the sole active virtual-machine thread of a virtual machine from said second physical processor of said target proximity to said first physical processor of said source proximity.

7. A system comprising:
    physical processors arranged in plural proximities such that inter-processor communications between processors in different proximities are over a common bus, while inter-processor communications between processors within the same proximity are over a bus local to that proximity;
    a hypervisor and virtual machines, each of said virtual machines having a respective number of threads active at any given time; and
    said hypervisor:
        mapping virtual-machine threads to virtual processors such that each virtual-machine thread is mapped to one virtual processor at any given time;

forming, in response to the mapping of virtual-machine threads, virtual-processor groups of said virtual processors, said virtual-processor groups being formed such that each virtual-processor group has a number of virtual processors that matches a number of unassigned physical processors of a respective proximity, said virtual-processor groups being formed by selecting virtual processors that provide a total estimated virtual-machine thread interactivity for the virtual-processor group that is greater than average virtual-machine thread interactivity for virtual-processor groups having the same number of said virtual processors, total estimated virtual-machine thread interactivity being based on the virtual-machine threads mapped to virtual processors of a virtual-processor group; and assigning each of said virtual-processor groups to respective ones of said proximities so that virtual processors of a virtual-processor group are mapped to physical processors of the respective proximity so that the virtual-machine threads assigned to virtual processors of a virtual-processor group execute on respective physical processors of the proximity to which the virtual-processor group is assigned.

8. A system as recited in claim 7 further comprising computer-readable storage media encoded with code defining said hypervisor and said virtual machines.

9. A system as recited in claim 7 wherein said hypervisor assigns virtual-machine weights to said virtual machines, assigns edge weights to pairs of said virtual processors at least in part as a function of the virtual-machine weights assigned to the virtual machines whose virtual-machine threads are assigned to each of the virtual-processors of each of said pairs, and assigns virtual processor weights to each of said virtual processors at least in part as a function of the edge weights of virtual-processor pairs including the respective virtual processor.

10. A system as recited in claim 9 wherein said estimated virtual-machine thread interactivity is at least in part a function of said edge weights.

11. A system as recited in claim 9 wherein said hypervisor assigns virtual processors to communities such that at most negligible interaction is expected between communities, said hypervisor assigning a processor of a community having the greatest virtual-processor weight among virtual-processors in its community to a virtual-processor group.

12. A system as recited in claim 9 wherein said hypervisor assigns virtual processors to communities such that at most negligible interaction is expected between communities, said hypervisor removing a processor of a community having the least virtual-processor weight among virtual-processors in its community from said community.

13. A system comprising non-transitory computer-readable storage media encoded with code for assigning virtual-machine threads to physical processors arranged in plural proximities such that inter-processor communications between processors in different proximities are over a common bus, while inter-processor communications between processors within the same proximity are over a bus local to that proximity, said code providing for:

mapping virtual-machine threads to virtual processors such that each virtual-machine thread is mapped to one virtual processor at any given time;

forming, in response to the mapping of virtual-machine threads, virtual-processor groups of said virtual processors, said virtual-processor groups being formed such that each virtual-processor group has a number of virtual processors that matches a number of unassigned physical processors of a respective proximity, said virtual-processor groups being formed by selecting virtual processors that provide a total estimated virtual-machine thread interactivity for the virtual-processor group that is greater than average virtual-machine thread interactivity for virtual-processor groups having the same number of said virtual processors, total estimated virtual-machine thread interactivity being based on the virtual-machine threads mapped to virtual processors of a virtual-processor group; and assigning each of said virtual-processor groups to respective ones of said proximities so that virtual processors of a virtual-processor group are mapped to physical processors of the respective proximity so that the virtual-machine threads assigned to virtual processors of a virtual-processor group execute on respective physical processors of the proximity to which the virtual-processor group is assigned.

14. A system as recited in claim 13 further comprising said processors for executing said code.

15. A system as recited in claim 13 wherein said code further provides for:

assigning respective virtual-machine weights to virtual machines;

assigning a respective edge weight to each pair of said virtual processors at least in part as a function of the virtual machines that are the sources of virtual-machine threads assigned to the virtual processors of each pair; and assigning a virtual-processor weight to each virtual processor at least in part as a function of the edge weights for each pair of virtual processors to which that virtual processor belongs.

16. A system as recited in claim 13 wherein said forming involves:

assigning virtual processors to communities so that there is at most negligible estimated interaction between communities; and forming virtual-processor groups of virtual processors from communities that are too big to fit within the available capacities of respective proximities so that the virtual-processor groups can fit within the available capacities of those proximities.

17. A system as recited in claim 13 wherein said code further provides for, after said virtual-processor groups are assigned to proximities:

moving a virtual-machine thread from a first physical processor of a source proximity in which it has at most negligible expected interaction with other physical processors in said source proximity to a second physical processor of a target proximity in which it has significant expected interaction with a virtual-machine thread assigned to a third physical processor of said target proximity; and moving a virtual-machine thread that is the sole active virtual-machine thread of a virtual machine from said second physical processor of said target proximity to said first physical processor of said source proximity.

* * * * *